No. 750,753. PATENTED JAN. 26, 1904.
R. C. CONTARDO.
ELECTRIC FURNACE.
APPLICATION FILED AUG. 24, 1900.
NO MODEL. 2 SHEETS—SHEET 1.

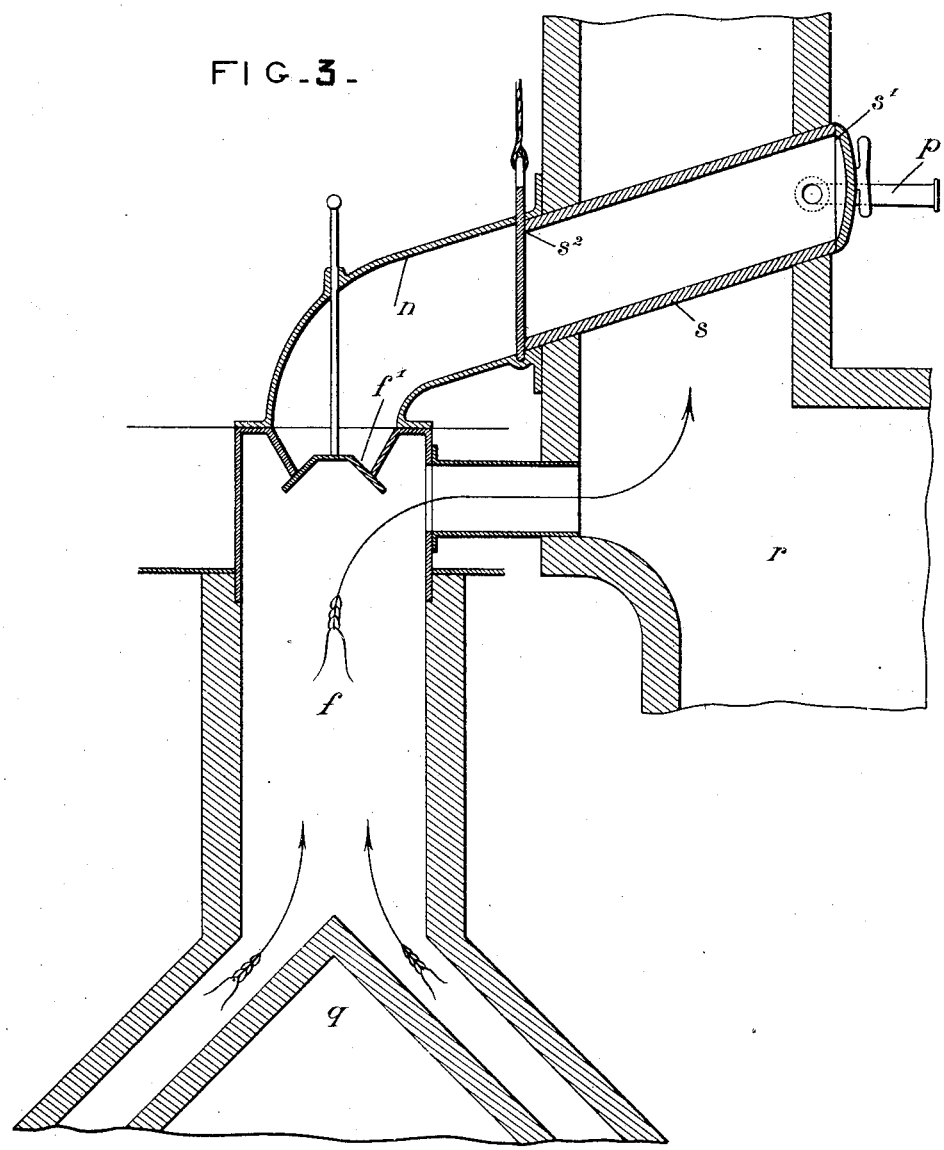

No. 750,753. Patented January 26, 1904.

UNITED STATES PATENT OFFICE.

RÁMON CHAVARRIA CONTARDO, OF SÈVRES, FRANCE.

ELECTRIC FURNACE.

SPECIFICATION forming part of Letters Patent No. 750,753, dated January 26, 1904.

Application filed 24, 1900. Serial No. 27,913. (No model.)

*To all whom it may concern:*

Be it known that I, RÁMON CHAVARRIA CONTARDO, doctor of laws, a citizen of the Republic of Chile, residing at 19 Rue des Binelles, Sèvres, Department of Seine-et-Oise, France, have invented new and useful Improvements in Continuous Autonomical Electric Closed Breasted Furnaces with Hearths and Shafts, of which the following is a specification.

My invention relates to a furnace electrically heated by one or several arcs and arranged, as the case may be, so as to obtain by treating ores either the metal they contain or combinations or alloys of metals or even combinations of metals with other substances, (carbid of calcium, for instance,) the whole under the most favorable industrial conditions.

The manner in which my invention is to be performed or carried into practical effect will be readily understood on reference to the sheet of drawings hereunto annexed and the following specification.

Figure 1:
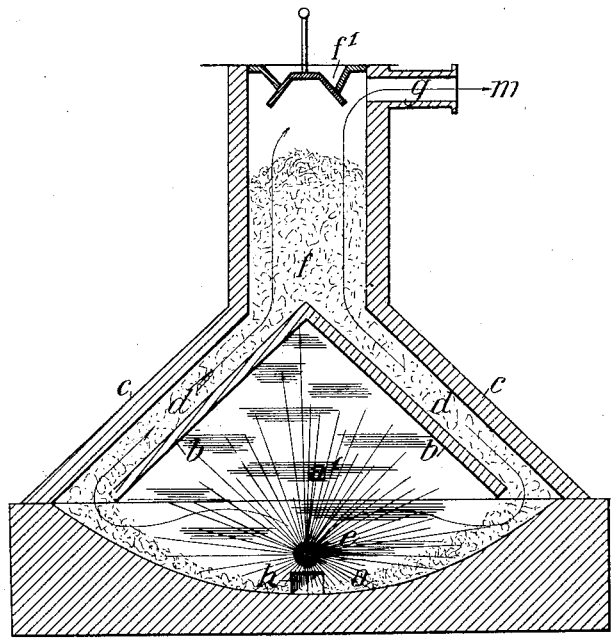
Figure 2:
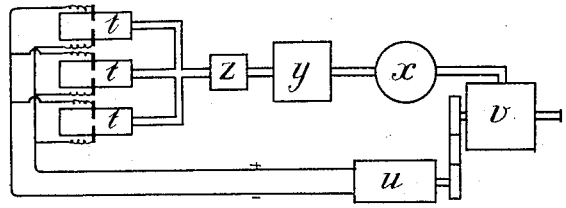

In the drawings, Figure 1 is a cross-section of an electric furnace constructed in accordance with my invention. Fig. 2 is a diagram of a complete plant arranged in accordance with my invention. Fig. 3 is a cross-sectional view, referring to a modification of the plant.

Continuousness—that is to say, the possibility of charging the mass or mixture of substances to be treated at one end of an apparatus and of collecting at the other end the products of such treatment—is not, with a few exceptions, a feature of the known reverberating furnaces. On the other hand, heating a hearth-furnace by a voltaic arc practically involves continuousness.

In order to utilize in the best possible manner a given radiating thermic energy, the employment of a hearth-furnace naturally suggests itself for the possibility of extending the hearth as far as the radiating energy requires it is precisely the appanage of reverberating furnaces, and the long series of researches to which I have devoted myself for several years has led me to recognize that the maximum useful effect of an arc of given intensity is obtained when a largest possible surface of the properly-spread charge is exposed to the direct radiation of the said arc. The absence of entrances and exits for the flames at opposite ends of an electric furnace allows the hearth to be extended and raised symmetrically on each side of the center line in inclined or curved surfaces of variable slope, according to circumstances. This raising is exceedingly favorable to the exposing of the charge to the direct radiation as also to its automatic descent in a thin layer, as the fusion clears away the foot of the inclines.

The grave defect of hearth-furnaces being the complete uselessness of the arch as an active surface, I have been naturally led to replace the ordinary arch by a double-sloped roofing made of plates more or less thin, according to the width of the furnace, these sloped roofs forming the bottoms of two inclined flues leading at their lower end to the inclines of the hearth and being joined at their upper end, so as to form a vertical shaft of any convenient height. The top of the shaft is closed in a similar manner to that of the most improved blast-furnaces and fitted with a gas-intake leading to purifiers and condensers, if necessary. My furnace is therefore closed-breasted.

In almost the whole of its uses my furnace is utilized for reducing oxid ores to obtain metal or combinations of metal. The reduction of the oxids by the carbon generates oxid of carbon and also gaseous hydrocarbons if the carbon be introduced into the charge in the form of coal, black pitch, (dry or not,) resin, &c. These gases are rich in utilizable available calories and are drawn from the furnace through the above-mentioned gas-intake and sent into a collecting and regulating gasometer should there be a battery of several furnaces. From there the gases are sent on to supply gas-engines of any convenient known type, which engines drive electric generators supplying the currents to the arcs in the furnace or furnaces. Thus when a properly-composed charge is fed into the top of the shaft of my furnace it is possible to obtain the necessary and sufficient amount of motive energy to produce the electric energy for heating the furnace. My furnace is therefore electro-autonomical. I may, however, point out that the fusing power of my furnace is much greater than its reducing power. If, therefore, ores have to be treated the reducing of which is particularly long and difficult, the efficiency of the furnace decreases more or less. In view of keeping the efficiency at a proper rate it is advantageous to employ in that case, in connection with the electric-arc furnace, a gasworks furnace in which the electric furnace sends its gases to heat the retorts. The charge is previously heated and more or less reduced in these retorts and then fed into the electric furnace through a conveniently-disposed chute or channel, so as to avoid any reoxidizing. The gases generated in the retorts are sent into the regulating-gasometer, which furnishes the fuel to the motors. This arrangement as a whole is therefore also entirely autonomical.

My furnace is composed, essentially, Fig. 1, of a reverberating furnace whose hearth $a$ is raised at a certain distance from the center and at either side into two inclined or curved surfaces, the length and slope of the said planes varying according to the composition of the charge. The arch instead of being constructed in the usual manner is formed by two symmetrically-inclined planes $b\,b$, arranged like a double-sloped roof and made of refractory plates whose ends rest on the end walls $a'$ of the furnace, which therefore perform the function of gables to the roof. These walls $a'$ extend for a certain height above the inclined planes $b\,b$ and support walls $c\,c$ parallel to the inclined planes. In this manner the roof of the furnace is formed by the two inclined flues $d\,d$, terminating at the bottom a small distance above the slopes of the hearth $a$ and uniting at the top to form a vertical and unique shaft $f$ of any convenient height. The charge fed, as in a blast-furnace, into the top of the shaft $f$ fills the two flues $d\,d$ and spreads itself on the hearth $a$, on which said charge continues to sink as the fusion clears away the foot of the inclines. The top of the shaft is closed by any known device $f'$, as has been already stated. The radiation of the voltaic arc or arcs between the electrodes (one of which is shown on the drawings at $e$) toward the upper part of the furnace, and which would be entirely lost with an ordinary arch, is utilized by means of the arrangement of the flues $d\,d$ to heat the charge through the plates $b\,b$, forming the bottom of these flues. A pipe $g$, leading from the upper part of the shaft $f$, carries off the gases generated by the reactions, as indicated by the arrows $m$. The charge being fed into the top of the vertical shaft, the gases generated by the reactions at the bottom of the furnace give off to the incoming charge at that point the last vestige of their free or uncombined heat. At the lower end of the vertical shaft the materials descend into the inclined flues, in which they are progressively heated, on the one hand, under the influence of the heat radiated upward by the arc and transmitted through the thin and good conducting-plates, preferably of plumbago, and, on the other hand, by the action of the gases coming from the hottest parts of the furnace and highly charged with free heat, which they give off to the materials they pass through. Finally, at the bottom of the inclined flues the charge spreads out on the inclines of the hearth in full sight of the arc and there the reactions previously started are completed and fusion obtained. The molten matter flows either directly out of the furnace or collects at the basin-shaped lowest point of the hearth, from whence it is tapped at intervals. With a continuous outflow the discharge-orifices $h$ should be made with siphons to prevent air-entry. The gases escaping from one or several furnaces through the pipes $g$ are aspirated (see Fig. 2) by a fan $z$, for instance, and driven into a purifier $y$ and from thence into a regulating-gasometer $x$. This gasometer supplies one or several gas-engines $v$, which drive one or several dynamo-electric machines $u$, which furnish the necessary current to the electric arcs, heating the one or several furnaces $t$.

When the ores to be treated are difficult to reduce, the charge is introduced into the inclined retorts $s$, Fig. 3, of a gas-works furnace $r$, heated by the gases escaping by the shaft $f$ from the electric-arc furnace $q$. The gases generated in the retorts $s$ are collected by a pipe $p$ and sent into the gasometer, as already stated. The charge is fed into the inclined retorts $s$ through their upper ends $s'$ and discharged through their lower ends $s^2$ and by means of a convenient chute or channel $n$, closed so as to avoid reoxidizing of the reduced charge into the shaft $f$ of the electric furnace $q$. I speak of $r$ as a "gas-works furnace," meaning thereby any sort of a furnace supporting a retort $s$ and having a flue for the passage of the heating-gases or products of combustion around the retort arranged in the flue, so that the retort is heated externally. In this manner the proportionally-weak reducing power is compensated by supplying to the furnace a charge already more or less reduced, so that its greater fusing power can be completely utilized without giving up the advantage of collecting the generated gases and utilizing them for producing the electric energy necessary to heat the electric furnace.

I claim—

1. An electric-arc furnace, comprising a hearth having an inclined surface, electrodes above the same, an arch above the hearth consisting of two symmetrically and downwardly inclined surfaces, and side walls parallel to said arch forming inclined flues, substantially as described.

2. An electric-arc furnace, comprising a hearth having an inclined surface, electrodes above the same, an arch consisting of two symmetrically and downwardly inclined surfaces, side walls parallel thereto forming flues, and a vertical shaft above the arch connected to the side walls, substantially as described.

3. An electric-arc furnace, comprising a hearth having an inclined surface, electrodes above the same, an arch consisting of two symmetrically and downwardly inclined surfaces, side walls parallel thereto, a vertical shaft, a pipe leading from said shaft, and means for opening and closing the charging-opening of said shaft, substantially as described.

4. An electric furnace, comprising a hearth upwardly inclined at each side of the center, electrodes above the same, an arch formed by surfaces downwardly inclined from the center, and feed-flues above the arch connecting the outer ends of the hearth with a charging-shaft, substantially as described.

5. An electric furnace, comprising a hearth having surfaces upwardly inclined at each side of the center, electrodes above the same, and an arch arranged above the hearth and electrodes and formed by two surfaces sloping downwardly from the center and forming the bottoms of feed-flues, said feed-flues communicating with the outer ends of the hearth and a charging-shaft, substantially as described.

6. An electric furnace, comprising a hearth having surfaces upwardly inclined at each side of the center, electrodes above the same, an arch above the hearth, feed-flues above the arch connecting the hearth with a charging-shaft, a gas-outlet in the charging-shaft, and means for closing the charging-opening of said shaft, substantially as described.

7. An electric furnace, comprising a hearth upwardly inclined at each side of the center, electrodes above the same, an arch formed by surfaces downwardly inclined from the center, feed-flues above the arch connecting the outer ends of the hearth with a charging-shaft, means for opening and closing the charging-opening of the charging-shaft, and a gas-outlet in said shaft, substantially as described.

8. An electric furnace, comprising a hearth upwardly inclined at each side of the center, electrodes above the same, an arch formed by surfaces downwardly inclined from the center, feed-flues above the arch connecting the outer ends of the hearth with a charging-shaft, means for opening and closing the charging-opening of the charging-shaft, a gas-outlet for said shaft, and means for aspirating gas through said outlet, substantially as described.

9. An electric furnace, comprising a hearth extended and raised symmetrically on each side of the center as inclined surfaces, electrodes above the hearth, and an arch arranged above the hearth and electrodes, and formed by two symmetrically-inclined plates sloping downwardly from substantially the center of the furnace, said plates forming the bottoms of two inclined feed-flues, terminating at their lower ends a little above the outer ends of the inclined surfaces of the hearth and uniting at their upper ends in a vertical charging-shaft, substantially as described.

10. An electric furnace, comprising a hearth extended and raised symmetrically on each side of the center as inclined surfaces, electrodes above the hearth, and an arch arranged above the hearth and electrodes, and formed by two symmetrically-inclined plates sloping downwardly from their points of jointure at substantially the center of the furnace, the ends of said plates resting on the end walls of the furnace and the said end walls extending above the inclined plates and supporting side walls arranged parallel to said plates, thereby forming inclined feed-flues above the arch of the furnace, substantially as described.

In testimony whereof I have signed my name to this specification in the presence of two subscribing witnesses.

RÁMON CHAVARRIA CONTARDO.

Witnesses:
   CLAUDIUS LUSSON,
   EDWARD P. MACLEAN.